United States Patent [19]

Pessimisis

[11] 4,410,443

[45] Oct. 18, 1983

[54] METHOD OF DISSOLVING IRON OXIDE-CHROME OXIDE SPENT SHIFT CATALYSTS TO PREPARE A NITRATE SOLUTION SUITABLE FOR USE IN PREPARING A NEW CATALYST

[75] Inventor: George N. Pessimisis, Westchester, Ill.

[73] Assignee: Katalco Corporation, Oak Brook, Ill.

[21] Appl. No.: 380,980

[22] Filed: May 24, 1982

[51] Int. Cl.³ ............................................. C09K 3/00
[52] U.S. Cl. ................................... 252/182; 423/395; 423/53; 423/150; 502/24
[58] Field of Search ................ 252/413, 182; 423/395, 423/150, 53

[56] References Cited

U.S. PATENT DOCUMENTS 4,305,846 12/1981 Jennings ............................. 252/470

FOREIGN PATENT DOCUMENTS 19989 12/1980 European Pat. Off. .
1252176 11/1971 United Kingdom ................ 252/470
1259381 12/1971 United Kingdom ................ 252/470

*Primary Examiner*—Patrick Garvin
*Assistant Examiner*—Cynthia A. Piezlock
*Attorney, Agent, or Firm*—John G. Premo; Robert A. Miller

[57] ABSTRACT

A method of preparing a solution of the nitrate of iron and mixed chromium from a spent iron oxide-chrome oxide shift catalyst which comprises dissolving said spend iron oxide-chrome oxide shift catalyst with nitric acid in the presence of from 5–25% by weight of the catalyst of an additive selected from the group consisting of ferrous sulfate and sodium thiosulfate.

1 Claim, No Drawings

METHOD OF DISSOLVING IRON OXIDE-CHROME OXIDE SPENT SHIFT CATALYSTS TO PREPARE A NITRATE SOLUTION SUITABLE FOR USE IN PREPARING A NEW CATALYST

This invention relates to solution preparation, in particular of the nitrates of iron and chromium.

The iron-chrome shift catalyst, when in use, contains a mixture of divalent and trivalent iron oxides, in combination with trivalent chromium oxide, and is usually brought into its active form by reducing an oxide precursor composition in a higher valency state. Some oxide compositions used in the past have contained hexavalent chromium, but this is undesirable because of toxicity and of the large heat evolution during reduction. It has, therefore, been proposed to reduce the hexavalent chromium to trivalent chromium during production of the oxide composition, for example by reaction with a divalent iron compound such as ferrous carbonate. This has the drawback that the only inexpensive iron compound from which the ferrous carbonate could be made is ferrous sulphate, so that steps have to be taken to avoid contamination of the oxide composition by sulphur or to prolong the reduction treatment until sulphur compounds have been driven out. Among the methods proposed for making low-sulphur oxide compositions are that described in UK No. 1,259,381, which describes an initial stage of precipitation of ferrous oxalate, and that described in UK No. 1,252,176, which describes thermal decomposition of nitrates. These methods are expensive, especially that of 1252176 because of the cost of the chromium nitrate and, accordingly, European published application No. 19989 which describes a method of making a solution of the nitrates of iron and chromium by reacting metallic iron or an alloy thereof with nitric acid in the presence of one or more hexavalent chromium compounds. Thereafter, the nitrates are converted to an intimate mixture of the oxides, preferably by way of co-precipitating them with an alkaline reactant.

Since iron-chrome shift catalyst has to be replaced after a few years' use, it would be very convenient if it could be converted to the mixed nitrate solution and, thus, to fresh catalyst. This invention is thus directed to the dissolution of spent high-temperature shift catalyst containing iron and chromium oxides with nitric acid.

THE INVENTION

I have discovered that when ground-high temperature spent iron and chromium oxide containing shift catalyst is treated with nitric acid and one or more additives from the group consisting of ferrous sulfate and sodium thiosulfate, remarkable dissolution of the spent catalyst is achieved.

HIGH TEMPERATURE SHIFT CATALYST

Compositions which are meant to be treated in this invention include iron oxide-chrome oxide shift catalyst and other iron oxide-chrome oxide catalyst compositions. The iron oxide-chrome oxide ratios of these materials may vary considerably, and it will be seen that the method described in this invention generally applies to all spent catalyst materials containing principally iron oxide and/or chrome oxide.

THE DISSOLUTION STEP

Dissolution of the iron-chrome catalyst is carried out in the following steps:
A. The iron-chromium oxide catalyst is ground;
B. The ground iron-chromium oxide catalyst treated with nitric acid and one or more additives of this invention;
C. The resultant slurry is then heated for a period of time, so as to obtain substantial dissolution of the iron-chrome catalyst material.

The nitric acid that may be utilized in this invention ranges in concentration from as low as 10% to as high as 64% $HNO_3$. Technically, in the process of this invention, a solution is made by first adding concentrated nitric acid to water, and then adding the shift catalyst to this solution. After the shift catalyst is added, the additives of the instant invention are employed.

The concentration of nitric acid employed will be seen and will be apparent to those skilled in the art and those familiar with handling acid materials.

The additives employed, as stated above, are ferrous sulfate and sodium thiosulfate. Generally, these additives will be present at a level of from 5–25% by weight of the spent catalyst that is to be dissolved. In an especially preferred composition of this invention, 15% ferrous sulfate, based upon the weight of the catalyst, is employed; and 2% sodium thiosulfate is employed based upon the weight of the catalyst to be dissolved, so as to give a total of 17% additive based upon the weight of the catalyst.

It will be seen that one additive may be used without the other or both additives may be used, as in the preferred practice of the invention, with each other.

The quantity of nitric acid used is preferably sufficient to dissolve the catalyst completely, in order to avoid changing the ratio of iron to chromium. Incomplete dissolution of the catalyst may, on occassion however, have to be accepted when, for instance, a catalyst has suffered accidental overheating or has been used at unusually high temperatures, such as in reducing gas production. In any event, however, it is advisable to check and, if necessary, adjust the iron to chromium ratio of the solution after dissolution has taken place prior to using the solution to form a new catalyst material.

Resultant nitrate solution of iron and chromium can then be employed in the preparation of new shift catalyst.

EXAMPLES

To 450 milliliters of water was added 385 cc of 63% $HNO_3$, 100 grams of dry ground spent shift catalyst analyzed as containing 90 weight percent $Fe_3O_4$, 8 weight percent $Cr_2O_3$, 15 grams of ferrous sulfate, and 2 grams of sodium thiosulfate. This slurry was then heated to 212° F. under refluxing conditions for three hours. A greenish solution with some percipitate was obtained. After cooling, slurry was filtered. Seven hundred forty milligrams of greenish filtrate and 10.2 grams of undissolved catalyst were obtained.

To show the effect of the additives of the instant invention, the identical experiment was repeated as above with the exception being that the ferrous sulfate and sodium thiosulfate were omitted. The amount of undissolved catalyst obtained in this instance was 85 grams or 85% of the resultant starting material.

Having thus described my invention, I claim:

1. A method of preparing a solution of the nitrate of iron and mixed chromium from a spent iron oxide-chrome oxide shift catalyst which comprises dissolving said spent iron oxide-chrome oxide shift catalyst with nitric acid in the presense of from 5-25% by weight of the catalyst of an additive selected from the group consisting of ferrous sulfate and sodium thiosulfate.

* * * * *